US008688668B1

(12) United States Patent  
Sawyer

(10) Patent No.: US 8,688,668 B1
(45) Date of Patent: Apr. 1, 2014

(54) METHOD AND APPARATUS FOR IMPROVED NAVIGATION AMONG SEARCH RESULTS

(75) Inventor: David G Sawyer, Campbell, CA (US)

(73) Assignee: Adobe Systems Incorporated, San Jose, CA (US)

( * ) Notice: Subject to any disclaimer, the term of this patent is extended or adjusted under 35 U.S.C. 154(b) by 24 days.

(21) Appl. No.: 13/183,988

(22) Filed: Jul. 15, 2011

(51) Int. Cl.
*G06F 7/00* (2006.01)

(52) U.S. Cl.
USPC ............ 707/705; 707/758; 715/206; 715/234

(58) Field of Classification Search
None
See application file for complete search history.

(56) References Cited

U.S. PATENT DOCUMENTS

| | | | |
|---|---|---|---|
| 5,317,511 A | 5/1994 | Jacobson | |
| 6,636,847 B1 * | 10/2003 | Spires | 707/770 |
| 6,741,972 B1 * | 5/2004 | Girardi et al. | 705/408 |
| 6,963,869 B2 * | 11/2005 | Burrows | 1/1 |
| 7,024,622 B1 | 4/2006 | Young | |
| 7,162,686 B2 | 1/2007 | Blazejewski et al. | |
| 7,587,392 B2 * | 9/2009 | Jhaveri et al. | 1/1 |
| 7,721,214 B2 | 5/2010 | Dowling | |
| 2004/0215593 A1 * | 10/2004 | Sharangpani et al. | 707/1 |
| 2005/0097458 A1 * | 5/2005 | Wilson | 715/517 |
| 2005/0172273 A1 * | 8/2005 | Volini et al. | 717/136 |
| 2007/0061410 A1 * | 3/2007 | Alperin | 709/217 |
| 2008/0126191 A1 * | 5/2008 | Schiavi | 705/14 |
| 2010/0145967 A1 | 6/2010 | Fu et al. | |

* cited by examiner

*Primary Examiner* — Fred I Ehichioya
*Assistant Examiner* — Hasanul Mobin
(74) *Attorney, Agent, or Firm* — Moser Taboada

(57) ABSTRACT

A method and apparatus for navigating amongst search results. In one embodiment, the method receives a item to search within a document and stores a start location representing the position within the document at the time the item is received. The method searches the document for instances of the item and stores, as an index, at least one item location within the document for each instance of the item. A search result representing a match between the item and content in the document is displayed and, upon selecting to return to the start location at any time while displaying the search result, returning to the start location to display at least a portion of the document at the start location.

18 Claims, 5 Drawing Sheets

METHOD AND APPARATUS FOR IMPROVED NAVIGATION AMONG SEARCH RESULTS

BACKGROUND

1. Field

Embodiments of the present invention generally relate to document searching/viewing techniques and, more particularly, to a method and apparatus for improved navigation among search results.

2. Description of the Related Art

In word processing applications and document viewing applications, such as ADOBE ACROBAT, ADOBE READER, MICROSOFT WORD, NOTEPAD, MAC TEXTEDIT and the like, while a user is viewing and/or editing a document, they have the ability to invoke a "FIND" operation to locate instances of a text string within the document being viewed.

Upon executing a 'FIND' operation, the program moves a cursor from a current location (start location) to a new location proximate the text string. The text string may be highlighted. Repeating the FIND operation causes the cursor to move to the next matching text string. Many programs have a specialized 'FIND' operation facilitating the use of 'PREVIOUS' and 'NEXT' commands to navigate among the search results. However, once a 'FIND' operation is performed, the start location is changed to the location of the text string being searched. It is not possible to automatically return to the start location within the document.

Therefore, there is a need for a method and apparatus for improved navigation among search results that facilitates automatic return to the start position in the document from which the search was initiated.

SUMMARY

Embodiments of the present invention generally comprise a method and apparatus for navigating amongst search results. In one embodiment, the method receives a item to search within a document and stores a start location representing the position within the document at the time the item is received. The method searches the document for instances of the item and stores, as an index, a item location within the document for each instance of the item. A search result representing a match between the item and content in the document is displayed and, upon selecting to return to the start location at any time while displaying the search result, returning to the start location to display at least a portion of the document at the start location.

Figure 1:
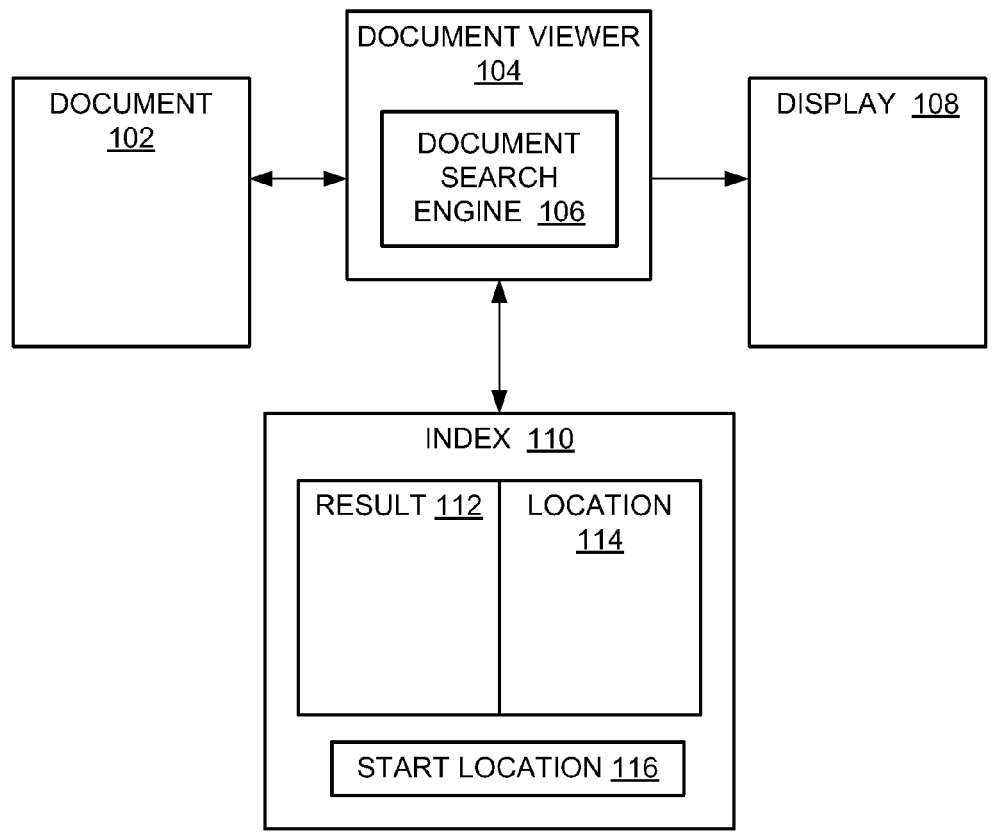
FIG. 1 depicts a functional block diagram of an apparatus for performing document display and searching, according to one or more embodiments.

While the system and method for improved forward/back operations among search results is described herein by way of example for several embodiments and illustrative drawings, those skilled in the art will recognize that the system and method for improved forward/back operations among search results is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the system and method for partial encryption of frame-based electronic content as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for improved navigation among search results are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Embodiments of the present invention comprise a method and apparatus for navigating through search results within a document. Embodiments search a document for an item, e.g., a text string, faces, audio clip, annotations, tags, and the like. For at least one matching item, its location in the document may be stored (e.g., indexed). In one embodiment, all the matching item locations are stored in a table. Alternatively, only a current matching item location is stored and a new location is determined upon selection of a search command. In addition, the "start location" for the search is stored. The start location is the location within the document at the time the search or find command is initially executed. When viewing the document, the user may select NEXT and PREVIOUS commands to navigate from search result to search result. Additionally, the user may select a START command to conveniently return to the start location to display at least a portion of the document at the start location.

FIG. 1 illustrates a functional block diagram of an apparatus 100 for performing document display and searching, according to one or more embodiments. The apparatus 100 comprises a document 102, a document viewer 104, an index 110, and a display 108. The document viewer 104 includes a document search engine 106. In one embodiment, the index 110 includes two attributes, namely a result 112 and a location 114. In other embodiments, only the location 114 is stored.

According to some embodiments, the document viewer 104 may be a word processor or other document editing application such as, ADOBE READER, ADOBE ACROBAT, and/or the like. ADOBE, ADOBE READER and ADOBE ACROBAT are trademarks of Adobe Systems Incorporated. The document viewer 104 includes the document search engine 106 for searching the document 102, which in turn creates the index 110. The document viewer 104 creates a display 108 of the document 102 including identified search results (e.g., highlighted) in the document 102.

According to some embodiments, the index 110 includes information related to search results in the form of one or more attributes, such as the result 112, and the location 114. Alternatively, the attributes may be a location and an extent representing the number of characters in a text string to highlight. The index 110 maintains at least one location of a search result. For example, the location may be represented by a page number and x,y location on the page (i.e., when the page is a fixed format such as a PDF) or represented as a character count from the beginning of the document (i.e., when the document has a reflowable format). Other techniques for identifying a location in a document may be used. In one embodiment, the index 110 maintains a list of locations (e.g., addresses) within the document of each and every search result. Additionally, the index 110 stores an initial location (start location) identifying a location of a cursor within the document at the time the search or find command is executed. In other embodiments, only the start location and the current search result location are stored. In this manner, with the selection of each navigation command, a new current search result location is determined and stored. When searching large documents, searching at each instance of navigation command selection displays the next search result without requiring the entire document to be searched, i.e., the next result is found and displayed quickly. In other embodiments, the first search result may be identified (highlighted) while the remaining search result locations are stored as a background operation.

According to some embodiments, upon user request, the document search engine 106 searches the document 102 for text strings (example: using a FIND command in ADOBE READER), and creates an index of all the search text string matches within the document 102 and their locations within the document 102. The user may then interact with the document 102 using PREVIOUS, NEXT, START, and DONE commands (e.g., buttons that invoke commands). When a user selects the START command, the cursor is immediately returned to the start location in the document 102.

In other embodiments, the document may comprise a multimedia file, including, for example, video and/or audio files. Annotations or tags may form keywords that are searched as text strings, or the content of the document may be searched for faces, object, and the like. In accordance with one embodiment, the starting location of a search within the multimedia file (e.g., a time tag, frame number and the like) is stored. When a START command is executed, the display returns to the stored start location in the multimedia file. The multimedia file may continue playing from the start location. Searching within such a document may be performed upon text annotations, dialog that has been converted from speech-to-text and stored as an annotation for each scene, scene descriptions, tags/annotations identifying objects, people, and the like in each scene, the content of the multimedia itself: people, objects, audio clips, other such content, and so on.

Figure 2:
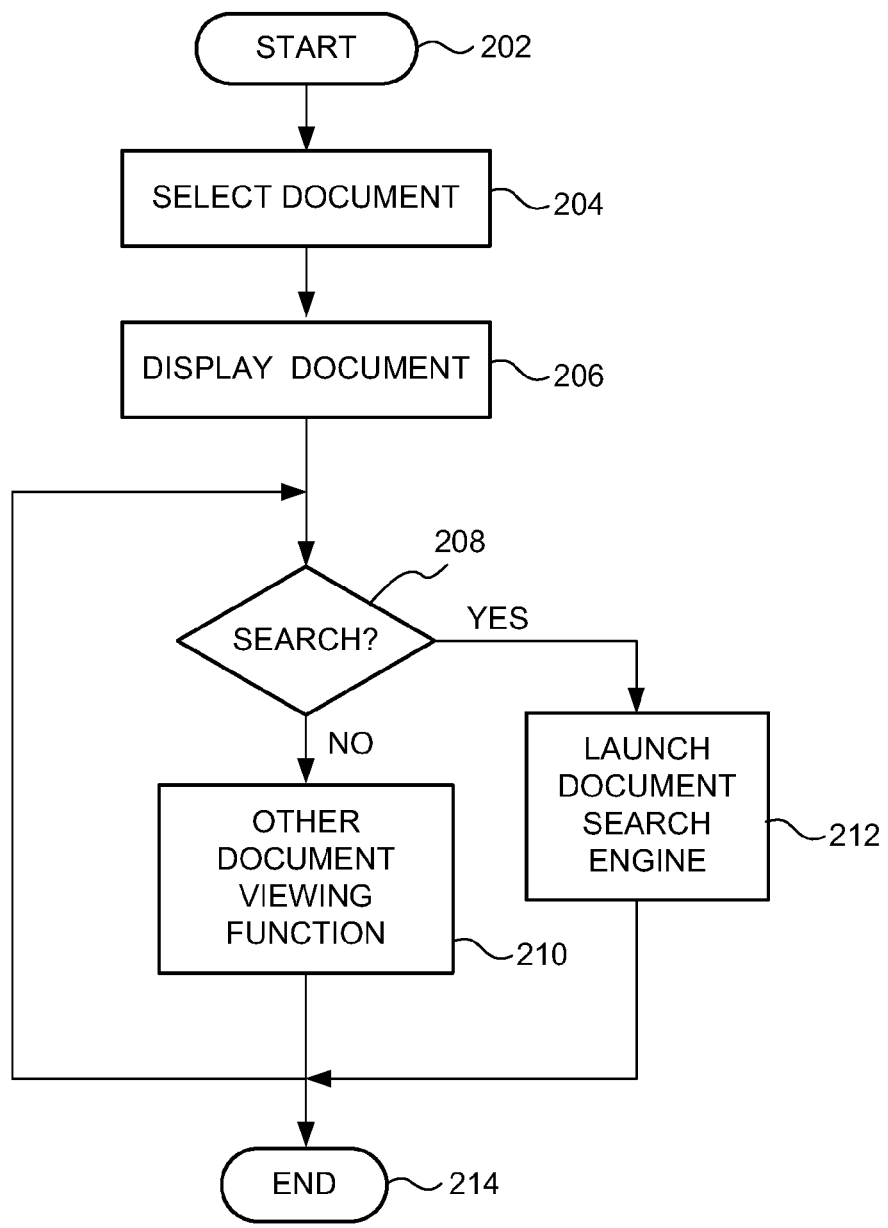
FIG. 2 depicts a flow diagram of a method of operation for the apparatus of FIG. 1, according to one or more embodiments.

FIG. 2 depicts a flow diagram of a method of operation for the apparatus of FIG. 1, according to one or more embodiments. According to some embodiments, method 200 is an implementation of the document viewer 104 of FIG. 1. The method 200 displays a document and, upon a user selecting a FIND (or SEARCH) command, launches the document search engine.

The method 200 starts at step 202 and proceeds to step 204. At step 204, a document (i.e., the document 102 of FIG. 1) is selected for display. In some embodiments, the method 200 may be launched upon a user selecting a document rather than launching the method 200 and then selecting a document. The selected document may be any searchable document. At step 206, the document is displayed. In some embodiments, the selected document is displayed in a format where a user may make entries and/or edits to the document. Further the user may also perform a search for items(s) of content within the selected document. In some embodiments, a text string can be any form of sequence of characters, such as a word, term, numerical entry, phrase, and the like. In other embodiments, the search term may be a face, object, audio clip, and the like.

At step 208, the method 200 queries whether a search is requested. A search may be invoked by a user selecting a FIND button, selecting an entry in a pull down menu, entering a text string (or other search item) into a search field, or the like. If the method 200 determines that a search is requested, the method 200 proceeds to step 212. At step 212, a document search engine (e.g., the document search engine 106 of FIG. 1) is launched At step 208, if the method 200 determines that a search is not requested, the method 200 proceeds to step 210. At step 210, the method 200 executes other document viewing functions. The method 200 proceeds to step 214, at which the method 200 ends.

Figure 3:
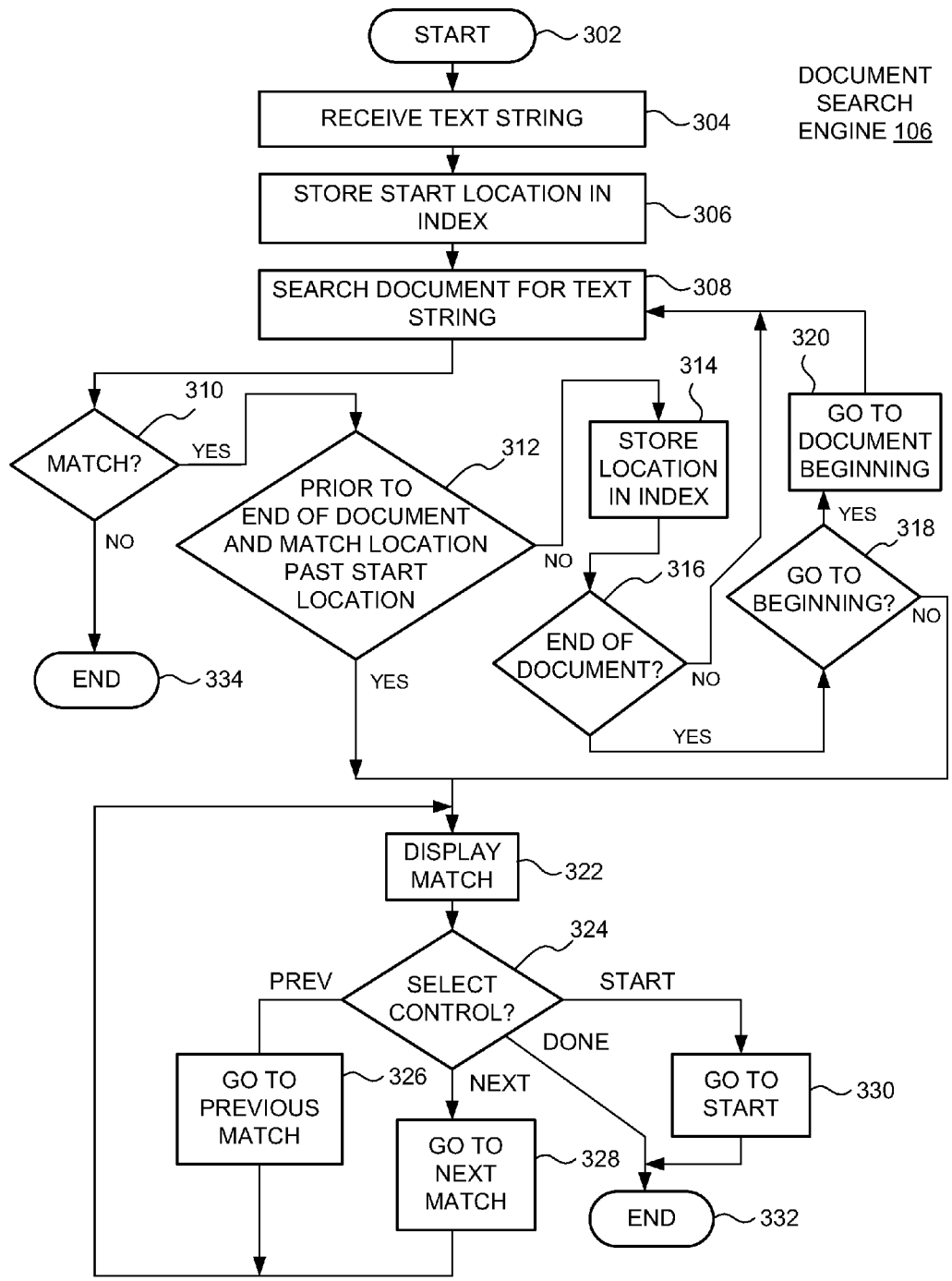
FIG. 3 depicts a flow diagram of a method of operation of a document search engine within the apparatus of FIG. 1, according to one or more embodiment.

FIG. 3 depicts a flow diagram of a method 300 of operation of a document search engine within the apparatus of claim 1 according to one or more embodiments. According to some embodiments, the method 300 is an implementation of the document search engine 106 of FIG. 1. The method 300 is one embodiment of the search engine for searching a document, indexing each location of a matching item, determining if an end of the document is reached, and allowing a user to select to continue the search at the beginning of the document or not. Once the matching items are indexed, the method 300 facilitates controlling a display of the matching items using NEXT and PREVIOUS commands. The user may also select a START command that immediately returns to the location being displayed at the time the search was initiated. The return to the start location may position the cursor at the start location within the document.

The method 300 starts at step 302 and proceeds to step 304. At step 304, the method 300 receives, in one embodiment, a text string to be searched. In other embodiments, the method may receive other items of content to search. In some embodiments, the document viewer (e.g., the document viewer 104 of FIG. 1) receives one or more items to be searched. The items are provided to the document search engine for processing. At step 306, a start location is stored in an index (e.g., start location 116 stored in the index 110 of FIG. 1). According to some embodiments, the index stores a start location of a cursor when a search is initialized by the user or some other identifier of where the search began, e.g., time stamp or frame in a multimedia file. At step 308, the document is searched for an item of content. The method 300 proceeds to step 310.

At step 310, the method 300 queries whether there is a match for the item in the document. If the method 300 determines that there is a match for the item in the document, then the method 300 proceeds to step 312. Further at step 310, if the method 300 determines that there is no match for an item in the document, then the method 300 ends at step 334. A message may be displayed indicating that no match was found.

At step 312, the method 300 queries whether the matched item is located prior to the end of the document and the location of the match is past the start location. If affirmatively answered, indicating the entire document has been searched, then the method 300 proceeds to step 322.

At step 312, if the cursor is at a location prior to the end of the document and the location of the match is past the start location (i.e., the entire document has not been completely searched), then the method 300 proceeds to step 314. At step 314, a location of the matching item in the document is stored in an index.

At step 316, the method 300 queries whether the search has reached the end of the document. If the method 300 determines that the search has reached the end of the document, then the method 300 proceeds to step 318. If the method 300 determines that the search has not reached the end of the document, then the method 300 proceeds to step 308. As such, the method 300 continues to search for a next item match.

At step 318, the method 300 queries whether the method 300 should proceed to the beginning of the document and continue the search. This step may use a query to the user and allow the user to decide to continue the search. Alternatively, the search may continue automatically. If the query at step 318 is affirmatively answered, the method 300 proceeds to step 320, where the method 300 goes to the beginning of the document and continues the search at step 308. If the query at step 318 is negatively answered, the search is ended and the method 300 proceeds to step 322.

At step 322, a match is displayed in the document by highlighting the first matching item in the index. In one embodiment, the cursor is also moved to the location. At step 324, a command from multiple controls is selected. Examples of the commands include, but are not limited to, PREVIOUS, START, NEXT, and DONE. In some embodiments, the user may have a flexibility of selecting any of these commands and move the cursor and highlighting to the search results within the document. In other embodiments, selecting the PREVIOUS command when the cursor is located at the first result causes the cursor to return to the start location and/or selecting a NEXT command when the cursor is located at the last search result causes the cursor to return to the start location. In documents where a cursor is not used, e.g., multimedia files, the search results will be displayed by moving from page-to-page, frame-to-frame, scene-to-scene and the like for each search result.

At step 326, if a user selects a PREVIOUS command, the cursor moves to the previous matching term within the document and the display is updated at step 322. At step 328, if a user selects a NEXT command, the cursor moves to the next matching term within the document and the display is updated at step 322. At step 330, if a user selects a START command, the method 300 displays the start location within the document from where the user initiated the search and the method 300 ends at step 322. If a user selects DONE, then the method 300 terminates at step 332.

Figure 4:
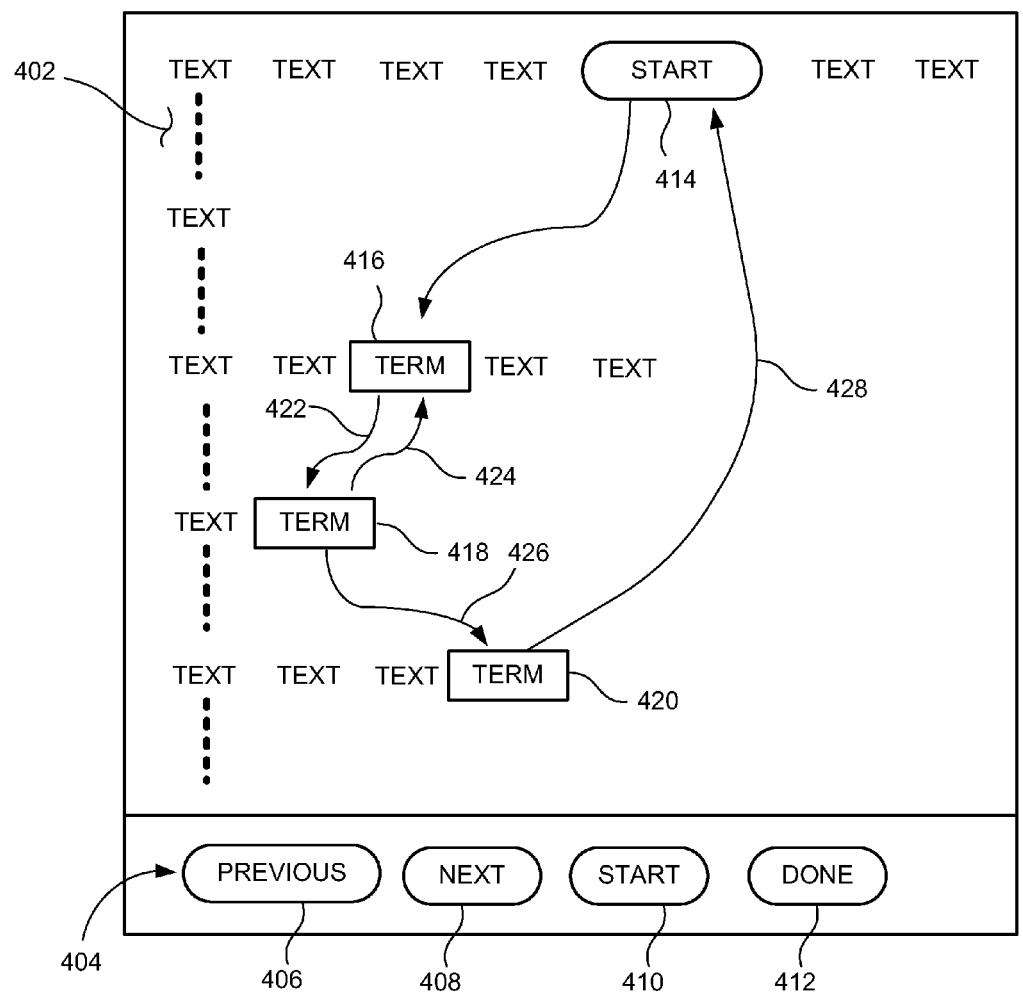
FIG. 4 represents a document within a display having various command buttons as produced by the apparatus of FIG. 1 according to one or more embodiments.

FIG. 4 represents a document 402 within a display 400 showing various command buttons as produced by the apparatus of FIG. 1 according to one or more embodiments. As illustrated, a display 400 comprises command buttons 404, such as PREVIOUS button 406, NEXT button 408, START button 410, DONE button 412. In alternative embodiments, the navigation commands may be implemented with keyboard shortcuts, pull down menus, touch screen gestures, and/or the like. Within the document 402, in response to the user searching for the text string TERM, the start location 414 is indexed and the locations 416, 418, 420 within the document are indexed. After indexing, method 300 of FIG. 3 highlights the first instance of the text string (location 416). When a user selects the NEXT button 408, the text string at location 418 is highlighted (i.e., the change is represented by arrow 422). Selecting the PREVIOUS button returns the highlighting to location 416 (arrow 424). Selecting the NEXT button at location 418 highlights the location 420 (arrow 426). If the user selects the START button at any time, the display is returned to the start location 414 (arrow 428) to display at least a portion of the document at the start location. If user selects the DONE button 412, the search engine exits and return to the document viewer.

Example Computer System

Figure 5:
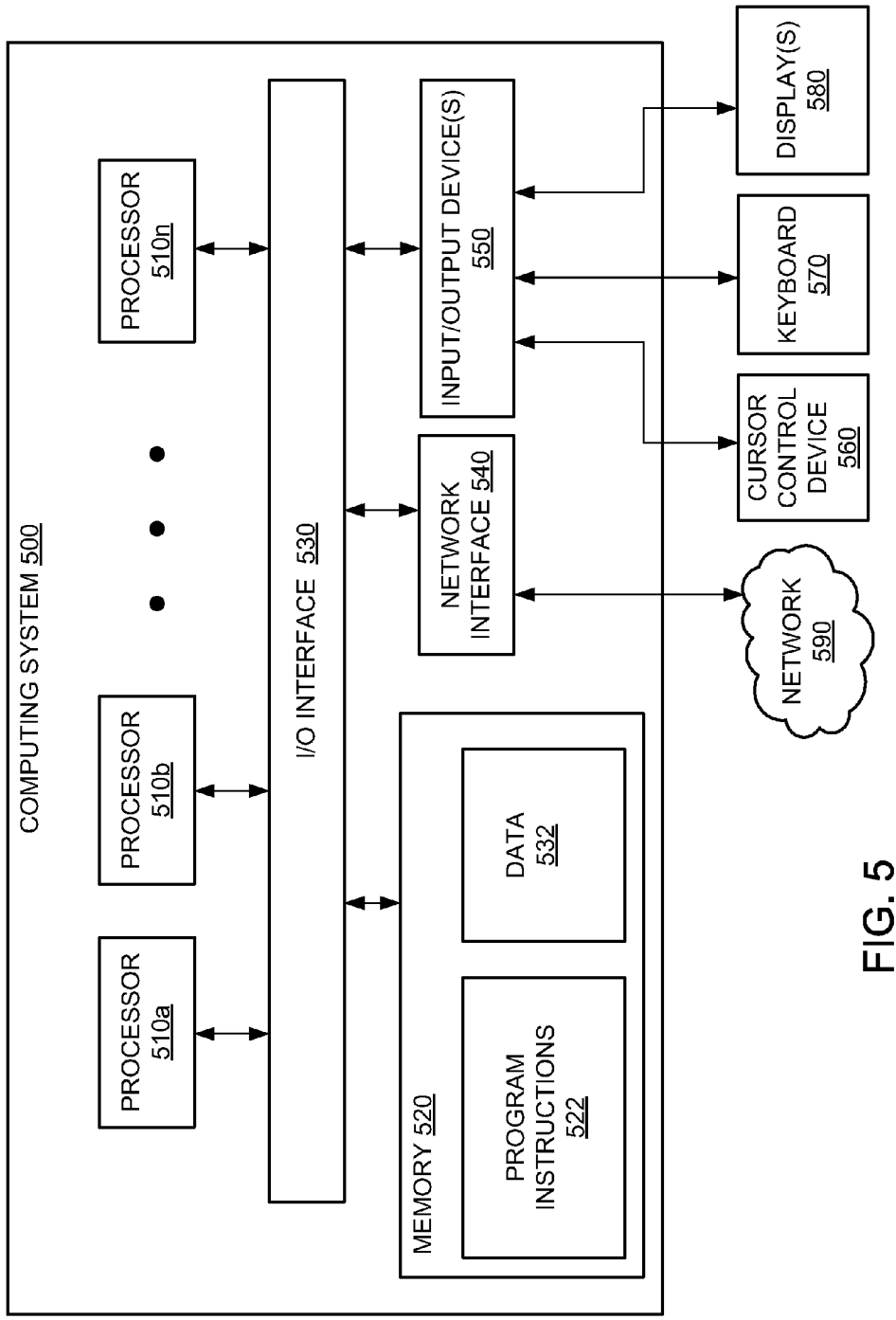
FIG. 5 is a block diagram of a computing system that can be utilized to implement the apparatus of FIG. 1, according to one or more embodiments.

FIG. 5 is a block diagram of a computing system that can be utilized for the present invention, according to one or more embodiments.

Various embodiments of a system and method for performing document searching for text strings, as described herein, may be executed on one or more computer systems, which may interact with various other devices. One such computer system is computer system 500 illustrated by FIG. 5, which may in various embodiments implement any of the elements or functionality illustrated in FIGS. 1-4. In various embodiments, computer system 500 may be configured to implement method 200, 300 described above. While the illustrated system demonstrates computer system 500 implementing apparatus 100 containing the document viewer 104, computer system 500 may be used to implement any other system, device, element, functionality or method of the above-described embodiments. In the illustrated embodiments, computer system 500 may be configured to implement software as processor-executable executable program instructions 522 (e.g., program instructions executable by processor(s) 510) in various embodiments.

In the illustrated embodiment, computer system 500 includes one or more processors 510 coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In various embodiments, any of components 550-580 may be utilized by the system 500 to receive user input described above. In various embodiments, a user interface (e.g., user interface) may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs), such as the x96, PowerPC, SPARC, or MIPS ISAs, or any other suitable ISA. In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550, In some embodiments, I/O interface 530 may perform any necessary protocol, timing or other data transformations to convert data signals from one components (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 590), such as one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 550 may, in some embodiments, include one or more display terminals, keyboards, keypads, touchpads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the methods described above, such as the methods illustrated by the flowcharts of FIGS. 2, and 3. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Various elements, devices, modules and circuits are described above in association with their respective functions. These elements, devices, modules and circuits are considered means for performing their respective functions as described herein.

While the foregoing is directed to embodiments of the present invention, other and further embodiments of the invention may be devised without departing from the basic scope thereof, and the scope thereof is determined by the claims that follow.

The invention claimed is:

1. A computer implemented method for navigating amongst search results comprising:
   receiving an item to search within a text document;
   storing a start location representing a cursor position within the text document at the time the item is received, wherein the start location is not the beginning of the document;
   searching the text document for at least one instance of the item, where the at least one instance forms at least one search result representing a match between the item and content in the text document;
   storing, as an index, at least one item location within the text document for at least one instance of the item;
   causing display of a search result;
   selecting to return to the start location at any time while the search result is displayed, thereby returning the cursor to the start location; and
   wherein, selecting to return to the start location is performed by selecting a START command.

2. The method of claim 1 wherein the index comprises the at least one item location of the at least one search result within the document.

3. The apparatus of claim 1 wherein the index comprises the at least one item location for every instance of the item within the document.

4. The method of claim 1 further comprising executing a DONE command for terminating the searching.

5. The method of claim 1 wherein the causing display step further comprises highlighting the search result.

6. The method of claim 1 wherein the cursor is returned to the start location when at least one of: a NEXT command is selected and a last search result in the document is currently displayed, or a PREVIOUS command is selected and a first search result in the document is currently displayed.

7. An apparatus for navigating amongst search results comprising:
   a computer having one or more processors coupled to a system memory and further comprising:
   a document viewer for displaying a text document containing at least one identified search result;
   storing a start location representing a cursor position within the text document at the time the item is received, wherein the start location is not the beginning of the document;
   a search engine, coupled to the document viewer, for providing the at least one search result to the document viewer and a location of the at least one search result, and for, upon selecting to return to a start location from which a search was initially executed at any time while displaying the search result, thereby returning a cursor to the start location, wherein the start location is not the beginning of the document; and
   wherein, selecting to return to the start location is performed by selecting a START command.

8. The apparatus of claim 7 wherein the search engine creates an index comprising the location of the at least one search result within the document.

9. The apparatus of claim 7 wherein the search engine creates an index comprising the location for every search result within the document.

10. The apparatus of claim 7 wherein the document viewer displays the document and a plurality of control buttons.

11. The apparatus of claim 10 wherein the plurality of control buttons comprises a button to invoke positioning a portion of the document being displayed at the start location.

12. The apparatus of claim 7 wherein the identified at least one search result is highlighted.

13. The apparatus of claim 7 wherein the cursor is returned to the start location when at least one of: a NEXT command is selected and a last search result in the document is currently displayed, or a PREVIOUS command is selected and a first search result in the document is currently displayed.

14. A non-transitory computer accessible medium for storing processor executable instructions that, when executed by a computing system, causes the computing system to perform a method comprising:
   receiving an item to search within a text document;
   storing a start location representing a cursor position within the document at the time the item is received, wherein the start location is not the beginning of the text document;

searching the text document for at least one instance of the item, where the at least one instance forms at least one search result representing a match between the item and content in the document;

storing as an index at least one item location within the text document for at least one instance of the item;

displaying a search result;

selecting to return to the start location at any time while displaying the search result, thereby returning the cursor to the start location to display at least a portion of the text document at the start location; and wherein, selecting to return to the start location is performed by selecting a START command.

15. The computer accessible medium of claim 14 wherein the index comprises the at least one item location of the at least one search result within the document.

16. The computer accessible medium of claim 14 further comprising executing a DONE command for terminating the searching.

17. The computer accessible medium of claim 14 wherein the displaying step further comprises highlighting the search result.

18. The computer accessible medium of claim 14 wherein at least a portion of the document being displayed is returned to the start location when at least one of: a NEXT command is selected and a last search result in the document is currently displayed, or a PREVIOUS command is selected and a first search result in the document is currently displayed.

* * * * *